(12) United States Patent  
Harris

(10) Patent No.: US 6,536,306 B1  
(45) Date of Patent: Mar. 25, 2003

(54) CORK SCREW WITH INTEGRAL INTELLIGENT THERMOMETER

(76) Inventor: Debra Fogel Harris, 9366 Aegean Dr., Boca Raton, FL (US) 33431

( * ) Notice: Subject to any disclaimer, the term of this patent is extended or adjusted under 35 U.S.C. 154(b) by 0 days.

(21) Appl. No.: 09/649,119

(22) Filed: Aug. 28, 2000

(51) Int. Cl.$^7$ ................................................. B67B 7/44
(52) U.S. Cl. ........................................ 81/3.09; 374/155
(58) Field of Search .................. 81/3.09, 3.36, 81/3.29, 3.45; 374/159, 155; 116/216

(56) References Cited

U.S. PATENT DOCUMENTS

| | | | |
|---|---|---|---|
| 4,538,926 A | 9/1985 | Chretien | 374/150 |
| 4,878,588 A | 11/1989 | Ephraim | 215/11.2 |
| 4,919,983 A | 4/1990 | Fremin | 428/35.7 |
| 4,962,765 A | * 10/1990 | Kung et al. | 374/155 |
| 5,482,373 A | 1/1996 | Hutchinson | 374/141 |
| 5,553,941 A | 9/1996 | Cope | 374/150 |
| 5,720,555 A | 2/1998 | Elele | 374/150 |
| 5,738,442 A | 4/1998 | Paron et al. | 374/162 |
| D404,491 S | 1/1999 | Scott | D24/197 |
| 5,983,783 A | * 11/1999 | Archard et al. | 374/155 |
| 5,997,927 A | 12/1999 | Gics | 426/383 |
| 6,000,845 A | * 12/1999 | Tymkewicz et al. | 374/155 |
| 6,158,227 A | * 12/2000 | Seeley | 62/56 |
| 2001/0040911 A1 | 11/2001 | Rubenstein | |

OTHER PUBLICATIONS

Instructions from the device in the Rubenstein application (Cite 1) p. 2 lists requirement that the probe cannot touch the bottle.

* cited by examiner

Primary Examiner—James G. Smith
(74) Attorney, Agent, or Firm—John C. Smith

(57) ABSTRACT

An intelligent cork screw device which determines the temperature of the bottle and informs the consumer as to what type of wine is suitable for that temperature. In a preferred embodiment, the cork screw provides a temperature readout. Alternative embodiments include temperature gauges which are marked to indicate the wines which are appropriate for that temperature. Other alternative embodiments provide entertainment features such as voice or other audio indications related to the temperature. Still other embodiments include visual indication such as lamps which indicate what type of wine would be proper for the temperature of the bottle being measured. The cork screw can use thermal measurement of the exterior of the wine bottle, or alternatively, the actual screw which penetrates the wine cork can be used as a temperature probe.

27 Claims, 7 Drawing Sheets

CORK SCREW WITH INTEGRAL INTELLIGENT THERMOMETER

BACKGROUND OF THE INVENTION

1. Technical Field

The present invention relates to wine equipment. In particular, it relates to an intelligent cork screw which has an integral temperature sensing device which is used in combination with audio or video output devices to tell the user what the current temperature of the wine is, and what wines are appropriate for that particular temperature. The intelligent cork screw has several optional output methods which include audio notification and/or visual notification.

2. Background Art

There is a large segment of the population who enjoy wine on a regular basis with meals, and at social occasions. To best enjoy a particular type of wine should be served within a temperature range suitable for that wine. For example, sparkling lines such as champagne are typically served cold, white wines are typically served slightly warmer sparkling wines, red wines are served warmer than white wines, and special wines such as sherry or port are served warmer than red wines.

A disadvantage associated with the enjoyment of wine is that the consumer may not know the proper temperature for the particular wine the consumer plans to drink that evening. Wine producers have attempted to assist consumers by printing the best temperature on wine labels. This simple step makes available to the consumer the correct temperature for consumption, but the consumer must still determine what the actual temperature of the wine is.

One attempt to improve upon the mere listing of the correct temperature has been to adhere a thermal strip thermometer to the side of the wine bottle. This allows a direct readout of the temperature of the wine. While this approach is convenient when preparing to drink the wine, it also has several disadvantages. One such disadvantage is the cost associated with attaching the thermal strip thermometer to the side of the wine bottle which is then discarded with the bottle. An additional disadvantage to this approach is that either the manufacturer, the merchant, or the consumer must bear the time, effort and expense involved with purchasing, stocking, and applying the thermal strip thermometers. It would be desirable to have a convenient and reusable method of determining the temperature of the wine prior to consumption.

It would also be desirable to provide a convenient and entertaining method of informing the consumer that the wine is at the correct temperature. By having a temperature indication system which was entertaining, consumers would be more likely to use it. In addition, the user would receive greater enjoyment from the wine by receiving training in what the proper temperature of that particular wine should be.

While addressing the basic desirability of drinking wine at the proper temperature, the prior art has failed to provide a convenient reusable device which is inexpensive to manufacture, provides a variety of information to the consumer, encourages its use, and provides entertainment to the consumer when it is used.

SUMMARY OF THE INVENTION

The present invention solves the foregoing problems by providing an intelligent cork screw device which determines the temperature of the bottle. The intelligent cork screw then provides information to the consumer related to the wine. In a preferred embodiment, the cork screw provides a temperature readout. Alternative embodiments include temperature gauges which are marked to indicate the wines which are appropriate for that temperature. Other alternative embodiment's provide entertainment features such as voice or other audio indications related to the temperature. Still other embodiments include visual indication such as lamps which indicate what type of wine would be proper for the temperature of the bottle being measured. The cork screw can use thermal measurement of the exterior of the wine bottle, or alternatively, the actual screw which penetrates the wine cork can be used as a temperature probe.

DESCRIPTION OF THE PREFERRED EMBODIMENT

Figure 1:
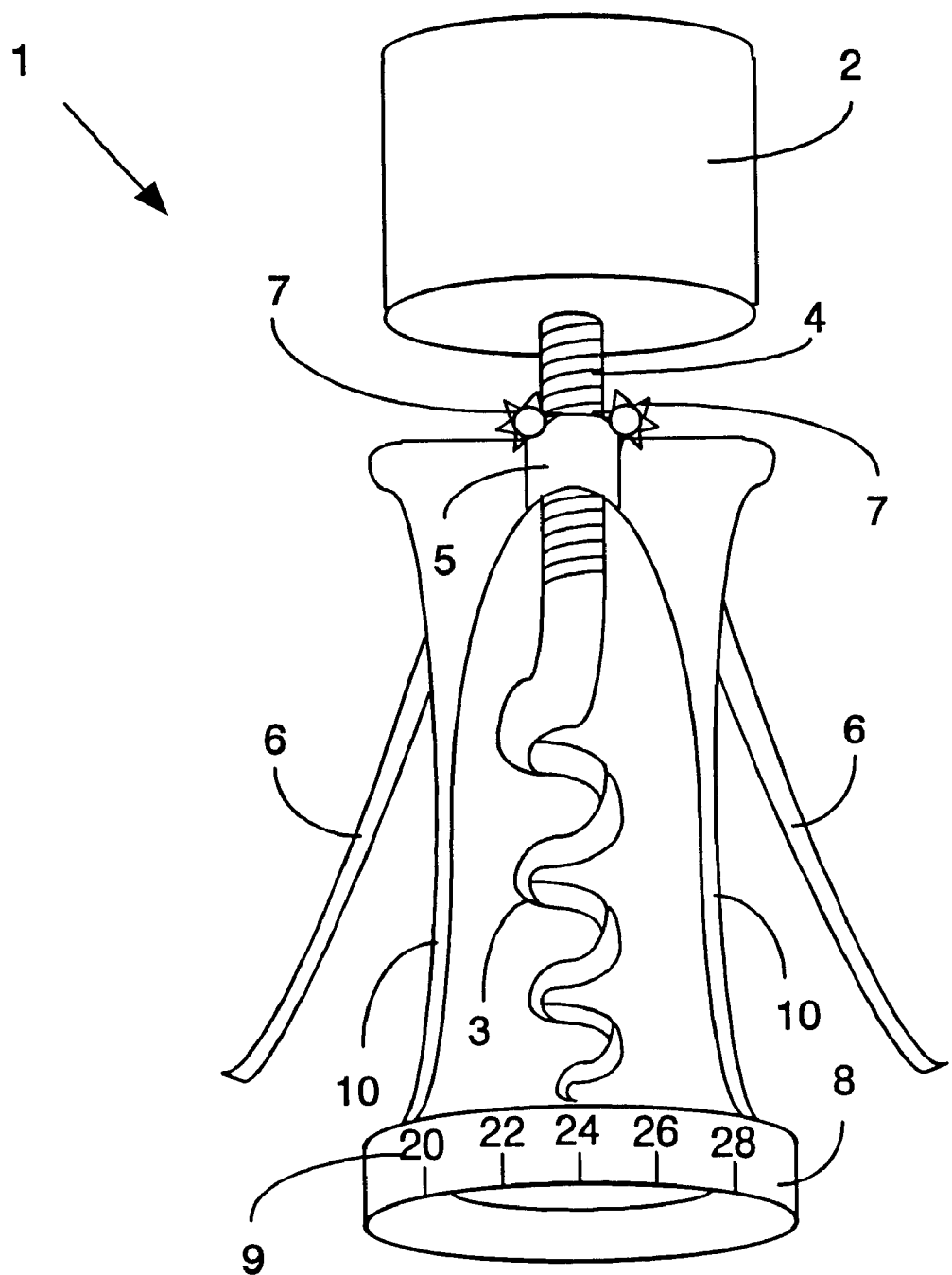
FIG. 1 is a side view of a preferred embodiment which illustrates a cork screw which has an integrated thermal strip that comes in contact with the wine bottle prior to opening.

Referring to FIG. 1, this figure shows a side view of a preferred embodiment of the invention. In this figure, a conventional cork screw 1 is shown which has a rotational knob 2 attached to a screw 3 via threaded shaft 4. The threaded shaft 4 is held to the cork screw body 10 via collar 5. When the screw 3 penetrates the cork (not shown), levers 6 which are movably attached via pivot assemblies 7 to cork screw body 10 and threaded shaft 4, can be used to extract the cork. Cork screws using levers, pivot assemblies, and threaded shafts are well known in the art.

This figure also illustrates a collar 8 with an integrated thermal strip which comes in contact with the wine bottle prior to opening. The collar 8 has indicia 9 in the thermal strip which provides a direct readout of the temperature of the bottle to the user prior to opening the bottle. In the event the wine is not at the proper temperature, it can be allowed to warm up or it can be chilled prior to opening.

Another advantage provided by this embodiment is that the temperature indication device is reusable and does not have to be replaced with every bottle as was the case with the disposable thermal strips discussed above. In addition, by integrating the temperature indication device with the cork screw, there is less chance that the temperature indication device would be accidentally discarded or lost. Further, since it is integrated with the cork screw 1, it provides a high level of convenience to a consumer, because the consumer must bring the cork screw 1 in contact with the wine bottle in order to open it. As a result, this embodiment provides extra information to a consumer while requiring no additional effort on the part of the consumer.

Figure 2:
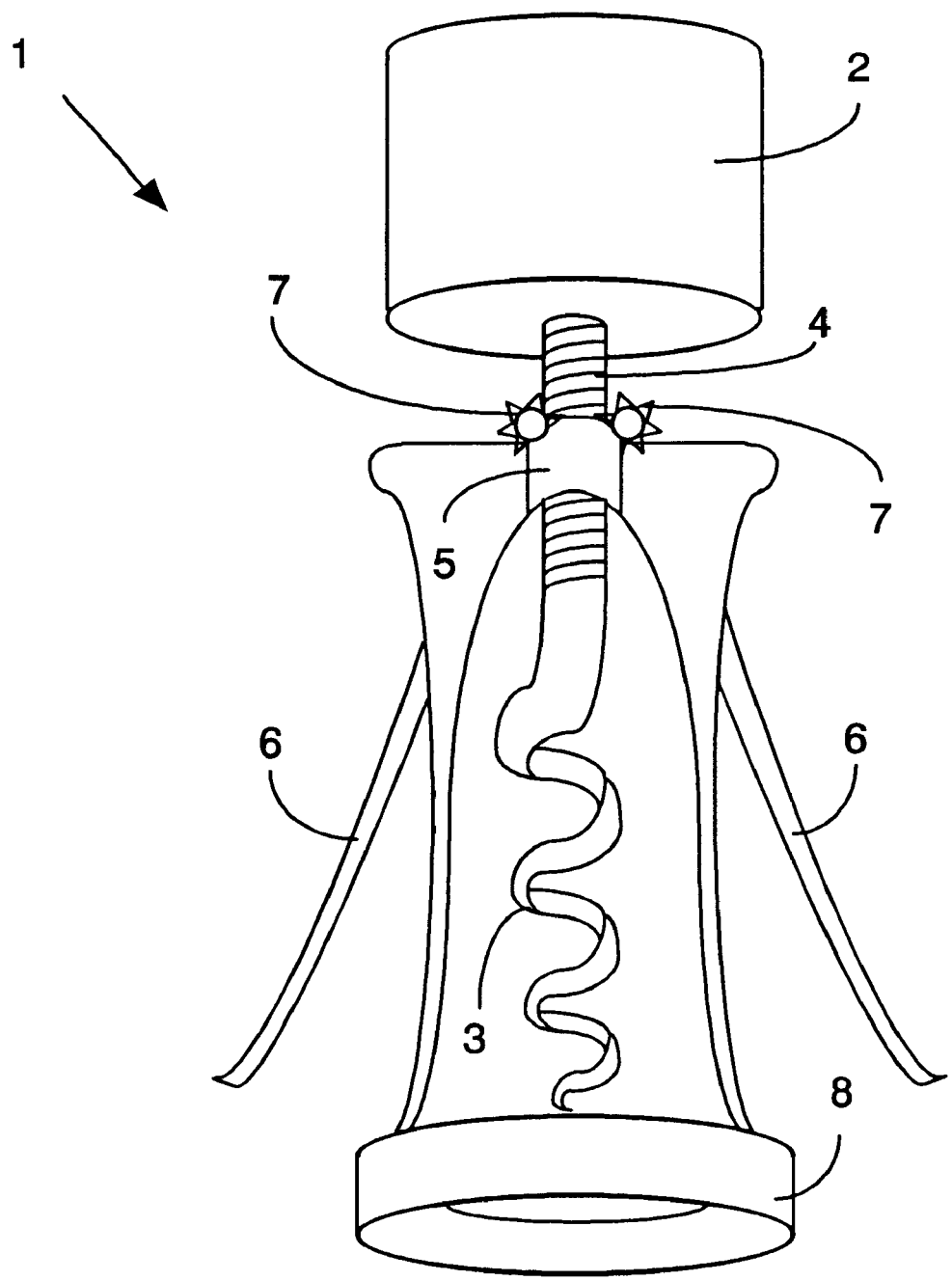
FIG. 2 is a side view of an alternative preferred embodiment which illustrates a cork screw that uses the cork penetration screw as a temperature probe.

In FIG. 2, an alternative preferred embodiment is shown that illustrates a cork screw 1 which uses the cork penetration screw 3 as a temperature probe. The cork penetration screw 3 is attached to the rotational knob 2 of the cork screw 1. The cork penetration screw 3 is also a temperature sensing device. When the cork penetration screw 3 penetrates the cork, the temperature of the wine is directly sensed. The rotation knob 2 contains the logic circuits and display and/or indication devices which are used by the consumer to determine if the wine is at the proper temperature. The logic circuits and display and/or indication devices will be discussed more fully below in regard to the following figures. If the wine is too hot or too cold, the cork penetration screw 3 can be threaded out of the cork without removing the cork from the bottle. This prevents the wine from decanting while the temperature is being altered. The bottle can then be either chilled or warmed until the wine is at the correct temperature.

Figure 3A:
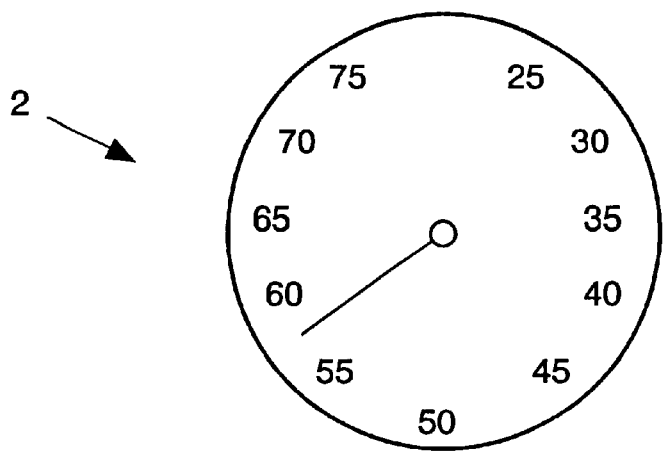
FIG. 3A is a preferred embodiment of the invention in which a temperature gauge is built into the rotation knob of the cork screw and provides a direct temperature readout.

FIG. 3A illustrates a top view of a preferred embodiment of the cork rotational knob 2. In this embodiment, a temperature gauge is built into the top of the cork rotational knob 2. The consumer would read the temperature indicated by the cork rotational knob 2 and then determine whether that was the proper temperature for the gauge can be implemented as either a mechanical gauge or as an electronic display which simulates the appearance of a mechanical gauge.

Figure 3B:
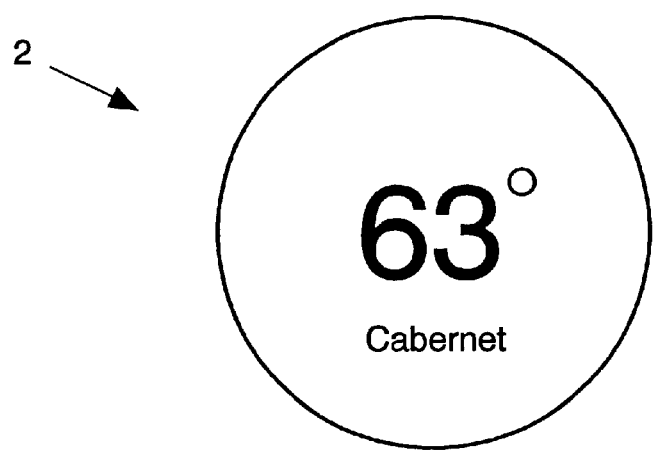
FIG. 3B is an alternative preferred embodiment of the invention in which a temperature gauge is built into the rotation knob of the cork screw and provides an electronic temperature display. This embodiment also displays the names of one or more wines which are suitable for the temperature of the bottle.

FIG. 3B illustrates a top view of another preferred embodiment of the cork rotational knob 2. In this embodiment, the temperature gauge is a digital readout which provides the temperature of the wine to the consumer.

This figure illustrates an optional feature provided by the invention. In particular, once the temperature of the wine is known, a small controller or microprocessor inside the cork rotational knob 2 can access an electronically stored list to determine one or more wines that are suitable for use at that temperature. Once the suitable wines are identified, their names can be displayed along with, or in place of, the temperature of the wine inside the bottle.

Figure 3C:
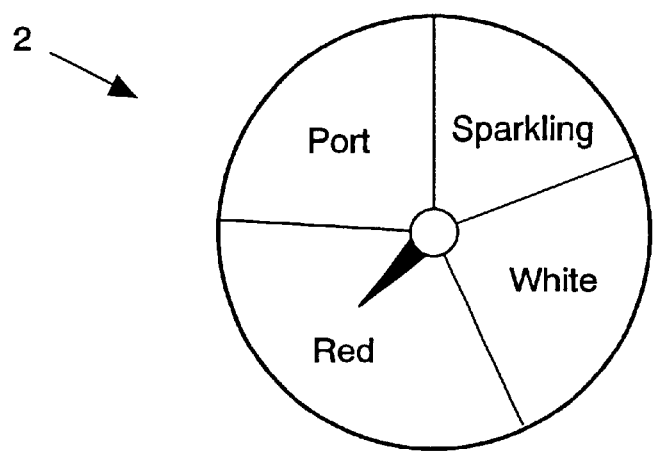
FIG. 3C is another alternative preferred embodiment of the invention in which a temperature gauge is built into the rotation knob of the cork screw and provides an electronic temperature display. This embodiment provides a graphic display of the types of wines which are suitable for the temperature of the bottle.

In FIG. 3C, a top view of another preferred embodiment of the cork rotational knob 2 is shown. In this embodiment, the temperature gauge is used to display the category of wine which would be appropriate for the temperature detected from the bottle. Those skilled in the art will recognize that within each general category (i.e. port, red, etc.), finer gradations can also be displayed. For example, within the section covering red wines, some varieties such as Burgundy or Cabernet can also be listed nearest the temperature that is appropriate for them.

As was the case above, this embodiment can also be implemented as a mechanical gauge or as an electronic gauge which simulates the look of a mechanical gauge. The device can also include audio capability (such as that discussed below in regard to FIG. 4) to provide an audio indication of the temperature, along with a message. The message may even be customized for a particular user. For example, if the name of the user is stored, then the message may be customized to say: "Mr. and Mrs. Harris, the wine has a temperature of 55 degrees."

Figure 4:
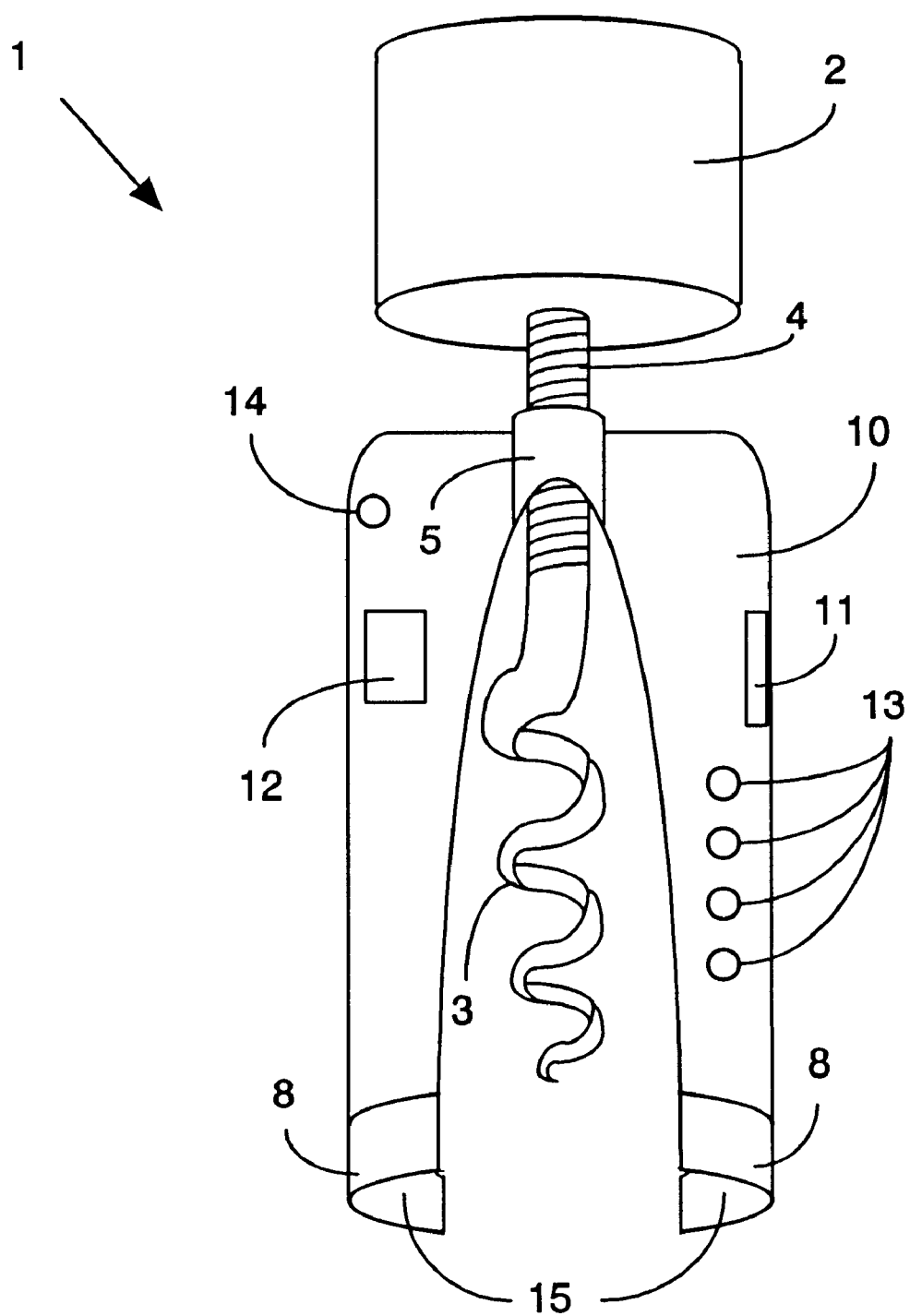
FIG. 4 is an alternative preferred embodiment in which the temperature detection and temperature indication devices are integrated into the body of the cork screw rather than the rotation knob of the cork screw.

FIG. 4 illustrates an alternative embodiment of the intelligent cork screw 1 in which the temperature detection devices and the output indication devices are built into the body 10 of the intelligent cork screw 1.

In this embodiment, the collar 8 has a temperature sensing device 15 (temperature sensors are well-known in the art) which comes in contact with the bottle prior to opening it. Once the temperature is detected, it can be displayed on display device 12 in the same manner that the temperature was displayed in previous embodiments. Likewise, once the intelligent cork screw 1 knows what the temperature is, it can display other information such as the best type of wine for that temperature, etc., just as similar information was displayed in the foregoing embodiments.

This figure illustrates several methods providing information to a consumer. For example, an alternative embodiment of displaying the proper wine category (i.e. red, white, etc) is to use an indicator lamp 13 rather than a display 12. The advantage of an indicator lamp 13 is that it can be fabricated from inexpensive material such as LEDs. On the other hand the display 12 can also be fabricated from a more expensive device such as an LCD display or a TFT display. In this figure, lamps 13 are shown for illustrative purposes. Each lamp 13 can indicate the particular wine category such as red, white, etc., and each lamp 13 can be a different color.

Also shown in this figure is speaker 11. Speaker 11 can be used in conjunction with stored audio data such that the intelligent cork screw 1 can tell a consumer what the temperature of the wine is. In addition, as was the case with previous output devices, the speaker can be used to audibly list appropriate wines for that temperature.

Another optional feature shown in this figure is microphone 14. Microphone 14 can be used to input data into an audio/video database (shown in FIG. 5) for later playback to the consumer. This feature provides entertainment value to the consumer, and allows the consumer to make customized messages. For example, the consumer can input information such as the user's name. The user's name can then be embedded in an audio message, as was discussed above in regard to FIG. 3B.

The audio input feature, when combined with voice recognition software, allows a user to input the name of a particular wine (e.g. Reisling) prior to placing the cork screw 1 in contact with the bottle. Circuitry inside the cork screw 1 would recognize the name of the wine and store data indicating the wine type within internal storage. When the temperature is finally measured, the wine type can be used to access a table of wine types which contained the appropriate temperature range for each wine type. If the measured temperature was outside of the appropriate temperature range, then the user would be notified that the temperature was not acceptable. Likewise, if the measured temperature was in the appropriate temperature range, then a message could be given to the user indicating that the wine was at an acceptable temperature.

In addition, once the ability to record audio information is provided, the device can also be used to record messages for amusement, etc.

Figure 5:
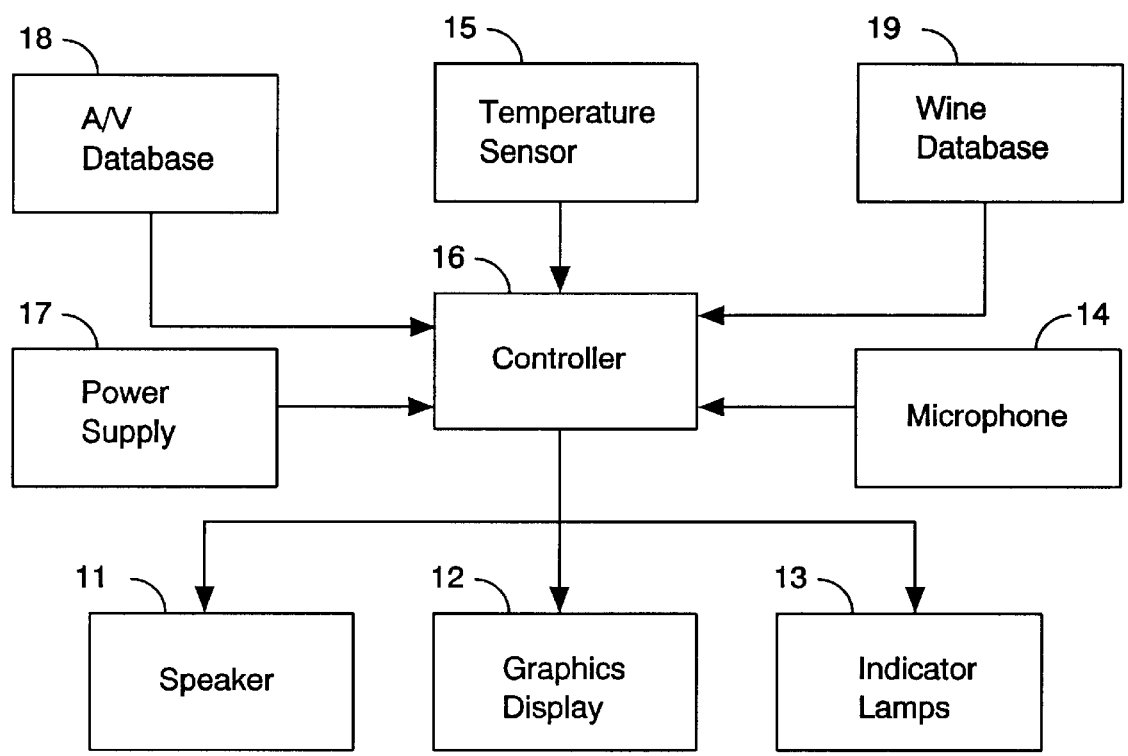
FIG. 5 is a block diagram of a preferred embodiment of the invention which illustrates the logical components of the invention and several optional output devices.

FIG. 5 is a block diagram illustrating the various components required to implement the invention, as well as optional features. A controller 16, which may be a fully functional microprocessor or a limited function control circuit, controls the movement of data through the intelligent cork screw 1. The controller 16 is powered by an internal power supply 17, typically a battery, which activates the controller 16 when it is turned on. For ease of illustration, the power supply on/off switch is not shown. Those skilled in the art will recognize that alternative power sources, such as solar cells may also be used.

The temperature sensor 15 inputs temperature data to the controller 16. The controller 16 can then present the temperature data to the consumer via the graphics display 12. In addition, the controller 16 can also use the temperature data to access the wine database 19 which contains information related to which wines are appropriate for the detected temperature. This data can then be displayed on the graphics display 12.

Also shown in this figure is an output database hereinafter denoted as A/V database 18 which contains audio and/or video data appropriate to wines. The controller 16 can also use the temperature data to access the A/V database 18 and select appropriate video data for that temperature which can then be displayed on graphics device 12. Those skilled in the art will recognize that the A/V database 18 can store audio data, video data, or both depending on the type of output desired for a particular design of the cork screw 1. Likewise, it can also be used to store information input by the user via microphone 14.

Another optional feature shown this figure is speaker 11. Once the controller 16 obtains the temperature data from temperature sensor 15, it can access the A/V database 18 using the temperature data and obtain an appropriate audio message to be played via speaker 11.

The indicator lamps 13 are another optional feature. When the controller 16 determines which category of wine is appropriate for the detected temperature, it can activate the appropriate indicator lamp 13 for that wine category.

An optional entertainment feature is also illustrated in this figure. Microphone 14 can be used to input data storage in the A/V database 18. This will provide the novelty of having the intelligent cork screw 1 speak to the consumer in the consumer's own voice. In the preferred embodiment, the microphone 14 would include a switch that would notify the controller 16 that audio input was desired. Software stored in the controller 16 or in a database such as the A/V database 18 can be used to guide the consumer a series of steps to determine which wine type or category of wine that the input audio segment would apply to. For example, the user can indicate Cabernet as the wine type. The controller 16 would then use voice recognition software (which is well known in the art) to access a lookup table to determine the correct temperature range for that wine. Once the correct temperature range was determined, the cork screw 1 can be used to measure the temperature of the bottle and provide an indication as to whether the wine was at a suitable drinking temperature. For example, a message indicating that wine is too warm may be played on the speaker 11.

Likewise, the speaker 11 can also be used to provide entertainment. Musical works, such as songs can also be stored in the A/V database 18. A particular song can be selected based on input data such as the name of a wine input with microphone 14. If the user inputs the name of a red wine, such as Merlot, the voice recognition can play a song if the wine is at the correct temperature. For example, the speaker 11 can be used to play "Red red wine . . . You make me feel so fine . . . You make me feel so fine . . . Red red wine."

In addition to musical output, the microphone 14 can also be used to input personal messages (for example, a birthday greeting, etc.), or to input other messages such as jokes.

Those skilled in the art will recognize that any of the output devices, the speaker 11, the indicator lamps 13, or the graphics display 12 can be used to output information to the consumer, either alone or in combination.

Figure 6:
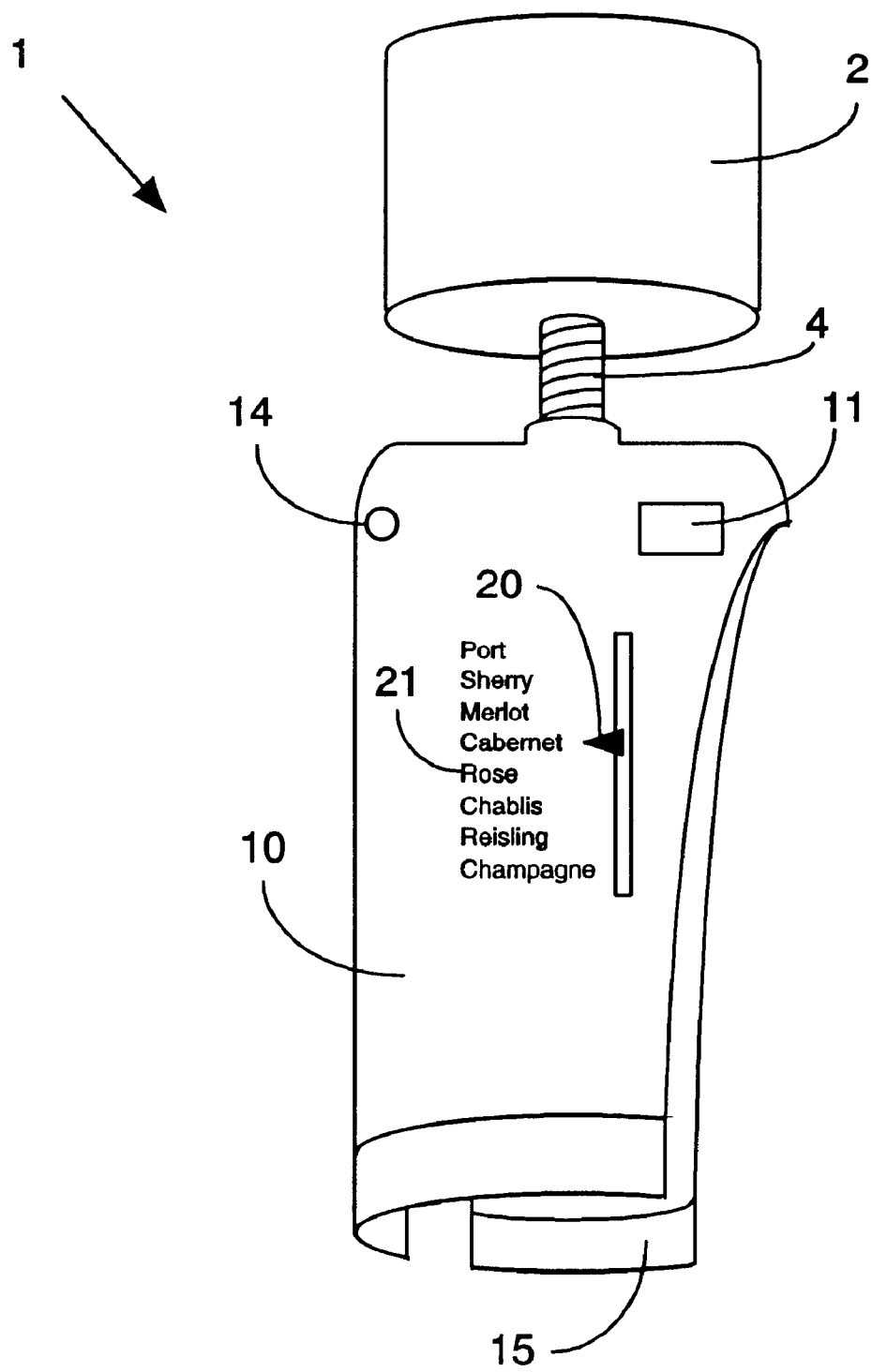
FIG. 6 is an alternative preferred embodiment in which a wine selector mechanism is incorporated into the cork screw to inform cork screw of the type of wine in the bottle.

In regard to FIG. 6, this figure illustrates an alternative preferred embodiment of the invention in which a wine selector mechanism 20 is used to define the type of wine in the bottle to the cork screw 1. For ease of discussion, the wine selector mechanism 20 is illustrated as a slide switch which the user merely slides to a position corresponding to a particular wine type in wine indicia 21. However, those skilled in the art will recognize that any type of switch mechanism can be used to implement this function. For ease of illustration, the electrical connection between the wine selector mechanism 20 and the controller 16 is not shown.

Once the wine selector mechanism 20 selects the appropriate wine type by using the wine indicia 21, the cork screw 1 knows the wine type and can then access the wine database 19 to determine the proper temperature for that wine automatically. When the temperature sensor 15 detects the temperature of the bottle, the cork screw 1 can then inform the user as to whether the wine is at a satisfactory temperature or not.

Figure 7:
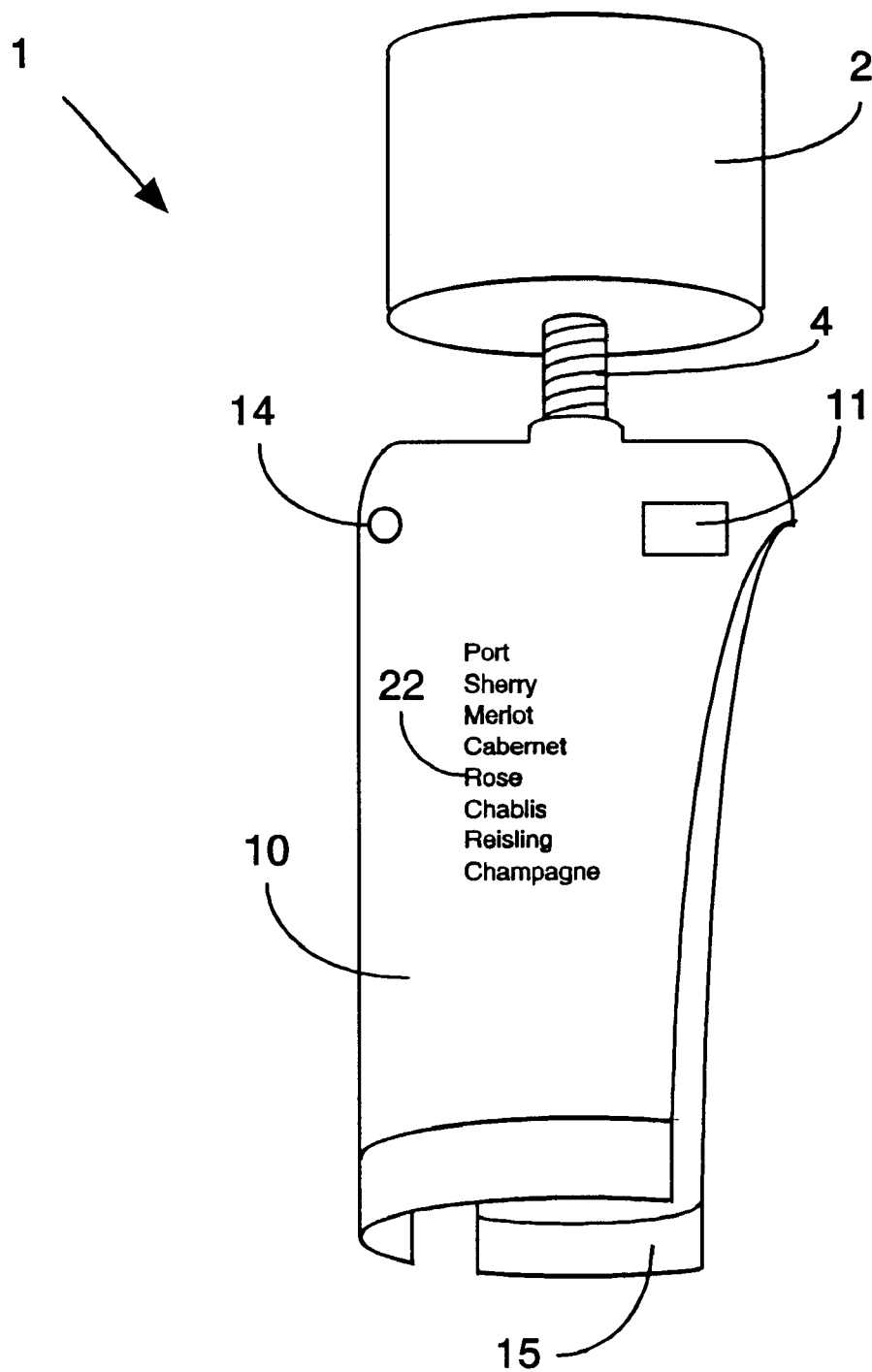
FIG. 7 is an alternative preferred embodiment in which EL lamps are used to indicate specific wine types which are appropriate for a particular bottle temperature.

In FIG. 7, an alternative preferred embodiment is shown in which electroluminescent (hereinafter EL) lamps 22 are used to indicate which wines are suitable for a particular bottle temperature detected by the temperature sensor 15. When the bottle temperature is detected by the temperature sensor 15, the controller 16 selects the appropriate EL lamp or lamps 22 which are then illuminated under control of controller 16. This embodiment is advantageous because it eliminates mechanical components from the cork screw related to the wine selector mechanism 20 shown in FIG. 6. Another advantage of EL lamps 22 is that they can be cut or masked to spell a particular wine's name, such as Merlot. EL lamps are well-known.

For ease of discussion, the cork screw structure used to illustrate the invention has been based on a conventional cork screw with a cork penetration screw 3. However, those skilled in the art will recognize that the features and advantages of the invention can be implemented with any cork screw, including those which do not penetrate the cork to remove it.

While the invention has been described with respect to preferred embodiment thereof, it will be understood by those skilled in the art that various changes in detail may be made therein without departing from the spirit, scope, and teaching of the invention. For example, the location of the various components can be any suitable location based on design choice, optional components (such as the speaker 11 or indicator lamps 13) can be used in conjunction with necessary components, the size and shape of the intelligent cork screw 1 can vary. The type of material used to fabricate the intelligent cork screw 1 can vary. Accordingly, the invention herein disclosed is to be limited only as specified in the following claims.

I claim:

1. An intelligent corkscrew for use with corked bottles, comprising: means to remove a cork from a bottle;
a temperature sensor to detect the temperature of the bottle;

a controller having means to input bottle temperature data from the temperature sensor;

an output database having selectable data related to wine;

means in the controller to select data from the output database data based on the bottle temperature;

means to output the detected temperature of the bottle;

the output database contains audio data; and means to select and output portions of the audio data based on the bottle temperature;

whereby the corkscrew outputs audio messages related to the bottle temperature prior to removal of the cork.

2. A corkscrew, as in claim 1, further comprising:

a microphone for inputting audio data into the audio/video database;

whereby personalized messages may be input to the audio/video database.

3. An intelligent corkscrew for use with corked bottles, comprising:

means to remove a cork from a bottle;

a temperature sensor to detect the temperature of the bottle;

means to output the detected temperature of the bottle;

a controller having means to input bottle temperature data from the temperature sensor;

an output database having selectable data related to wine;

means in the controller to select data from the output database data based on the bottle temperature;

a plurality of EL lamps, each EL lamp indicating a specific wine category or wine type; and means to activate at least one selected EL lamp based on the bottle temperature;

whereby the activated EL lamps indicate appropriate wines for the bottle temperature prior to removal of the cork.

4. A corkscrew, as in claim 1, further comprising:

a plurality of selectable lamps, each lamp associated with a wine category or wine type;

means to activate a selected lamp based on the bottle temperature;

whereby the lamps provide a visual indication of what type of wine is appropriate for the bottle temperature.

5. A corkscrew, as in claim 1, wherein:

the means to remove a cork include a cork removal screw; and the temperature sensor is the cork removal screw.

6. A corkscrew, as in claim 1, wherein the temperature sensor is attached to the corkscrew such that it contacts the surface of the bottle when the corkscrew is placed in position to remove a cork;

whereby the bottle temperature of a wine bottle is automatically measured when the corkscrew is placed in contact with the wine bottle.

7. An intelligent corkscrew for use with corked bottles, comprising:

means to remove a cork from a bottle;

a temperature sensor to detect the temperature of the bottle, further, the temperature sensor is a thermal strip which contacts the surface of a wine bottle when the corkscrew is placed in position to remove a cork and directly outputs the bottle temperature;

whereby the corkscrew outputs information related to the temperature of the bottle prior to removal of the cork.

8. A corkscrew, as in claim 1, further comprising:

a wine database containing information related to wine temperature; and means to output information based on the bottle temperature.

9. A corkscrew, as in claim 8, wherein the wine database includes information that indicates wine category.

10. A corkscrew, as in claim 8, wherein the wine database includes information that indicates specific wine types.

11. A corkscrew, as in claim 8, further comprising:

a wine selector mechanism having means to input a specific wine type;

means to indicate whether the bottle temperature is suitable for the specific wine type.

12. An intelligent corkscrew for use with corked bottles, comprising:

means to remove a cork from a bottle;

a temperature sensor to detect the temperature of the bottle;

means to output the detected temperature of the bottle;

a wine database containing information related to wine temperature;

means to output information based on the bottle temperature;

a wine selector mechanism having means to input a specific wine type, wine selector mechanism further comprising a slide selector and indicia;

means to indicate whether the bottle temperature is suitable for the specific wine type whereby the corkscrew outputs information related to the temperature of the bottle prior to removal of the cork.

13. An intelligent corkscrew for use with corked bottles, comprising:

means to remove a cork from a bottle;

a temperature sensor to detect the temperature of the bottle;

means to output the detected temperature of the bottle;

a wine database containing information related to wine temperature;

means to output information based on the bottle temperature;

a wine selector mechanism having means to input a specific wine type;

means to indicate whether the bottle temperature is suitable for the specific wine type;

an A/V database;

information in the wine database that indicates wine category; and means to output audio data from the A/V database based on the wine category related to the bottle temperature;

whereby the corkscrew outputs information related to the temperature of the bottle prior to removal of the cork.

14. A corkscrew, as in claim 13, further comprising:

an A/V database;

information in the wine database that indicates specific wine types; and graphic data is output from the A/V database based on the specific wine types related to the bottle temperature.

15. A corkscrew, as in claim 15, further comprising:

a microphone for inputting audio data to the A/V database;

whereby customized information can be stored in the A/V database.

16. A corkscrew, as in claim 15, wherein customized information is output from the A/V database based on the bottle temperature.

17. A corkscrew, as in claim 16, wherein the customized information is a musical work.

18. A corkscrew, as in claim 16, wherein the customized information is a prerecorded personal message or joke.

19. A corkscrew, as in claim 3, wherein the temperature sensor is attached to the corkscrew such that it contacts the surface of the bottle when the corkscrew is placed in position to remove a cork;

whereby the bottle temperature of a wine bottle is automatically measured when the corkscrew is placed in contact with the wine bottle.

20. A corkscrew, as in claim 3, further comprising:

a wine database containing information related to wine temperature; and means to output information based on the bottle temperature.

21. A corkscrew, as in claim 20, wherein the wine database includes information that indicates wine category.

22. A corkscrew, as in claim 20, wherein the wine database includes information that indicates specific wine types.

23. A corkscrew, as in claim 22, further comprising:

a wine selector mechanism having means to input a specific wine type;

means to indicate whether the bottle temperature is suitable for the specific wine type.

24. A corkscrew, as in claim 7, further comprising:

a wine database containing information related to wine temperature; and means to output information based on the bottle temperature.

25. A corkscrew, as in claim 24, wherein the wine database includes information that indicates wine category.

26. A corkscrew, as in claim 24, wherein the wine database includes information that indicates specific wine types.

27. A corkscrew, as in claim 24, further comprising:

a wine selector mechanism having means to input a specific wine type;

means to indicate whether the bottle temperature is suitable for the specific wine type.

\* \* \* \* \*